(12) United States Patent
Fortin et al.

(10) Patent No.: US 11,548,398 B2
(45) Date of Patent: Jan. 10, 2023

(54) LEAK DETECTION IN A CABLE ASSEMBLY

(71) Applicant: Tesla, Inc., Palo Alto, CA (US)

(72) Inventors: Pascal-Andre Fortin, San Francisco, CA (US); Martin Sukup, San Francisco, CA (US); Tim Murphy, San Jose, CA (US); Chuen Chou, Half Moon Bay, CA (US); Aria Tedjarati, Menlo Park, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 17/098,041

(22) Filed: Nov. 13, 2020

(65) Prior Publication Data

US 2021/0148780 A1    May 20, 2021

Related U.S. Application Data

(60) Provisional application No. 62/936,254, filed on Nov. 15, 2019.

(51) Int. Cl.
  *B60L 53/18*    (2019.01)
  *B60L 53/60*    (2019.01)
  (Continued)

(52) U.S. Cl.
  CPC ............. *B60L 53/18* (2019.02); *B60L 53/302* (2019.02); *B60L 53/305* (2019.02); *B60L 53/60* (2019.02);
  (Continued)

(58) Field of Classification Search
  CPC ....................................................... B60L 53/18
  (Continued)

(56) References Cited

U.S. PATENT DOCUMENTS

2015/0217654 A1*  8/2015  Woo ................ B60L 53/18
                                                  320/109
2015/0362543 A1* 12/2015  Gale ................ G01R 31/006
                                                  324/503
(Continued)

FOREIGN PATENT DOCUMENTS

DE   102016118193 A1 *  3/2018  ............. B60L 53/18
FR       3011075 A1      3/2015
WO    WO 18/231108      12/2018

OTHER PUBLICATIONS

Anonymous: "Voltage divider—Wikipedia", Wikipedia, Aug. 20, 2018, https://cn.wikipedia.org/wiki/Voltage_divider Retrieved on Feb. 2, 2021.

(Continued)

*Primary Examiner* — Jerry D Robbins
(74) *Attorney, Agent, or Firm* — Knobbe Martens Olson & Bear LLP

(57) ABSTRACT

A cable assembly includes a cable having a first end and a second end. The cable has an electric conductor and a cooling conduit, each of which extends from the first end to the second end. The cooling conduit is adapted to convey a fluid that cools the electric conductor. The cable assembly includes a leak detection module to detect a leak of the fluid from the cooling conduit. The leak detection module includes a power source to generate an input voltage signal which is applied at a first node contact with the fluid. The leak detection module includes a controller to monitor an output voltage signal at the first node and to detect a leak of the fluid from the cooling conduit based on the output voltage signal.

23 Claims, 5 Drawing Sheets

(51) Int. Cl.
     *B60L 53/302*   (2019.01)
     *B60L 53/30*    (2019.01)
     *H02J 7/00*     (2006.01)
     *G01M 3/18*     (2006.01)
     *H01B 9/02*     (2006.01)

(52) U.S. Cl.
     CPC ........... *G01M 3/181* (2013.01); *H02J 7/0045* (2013.01); *H02J 7/007188* (2020.01); *H01B 9/02* (2013.01)

(58) Field of Classification Search
     USPC ........................................................ 320/109
     See application file for complete search history.

(56) References Cited

U.S. PATENT DOCUMENTS

| | | | | |
|---|---|---|---|---|
| 2017/0144558 | A1* | 5/2017 | Remisch | H01B 9/02 |
| 2020/0234853 | A1* | 7/2020 | Lee | B60L 50/60 |
| 2020/0303093 | A1* | 9/2020 | Cantz | H01R 9/11 |

OTHER PUBLICATIONS

International Search Report and Written Opinion for International Application No. PCT/US2020/060528, Notification dated Feb. 19, 2021.

* cited by examiner

LEAK DETECTION IN A CABLE ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Patent Application No. 62/936,254, filed Nov. 15, 2019 and entitled "LEAK DETECTION IN A CABLE ASSEMBLY," which is hereby incorporated by reference in its entirety.

BACKGROUND

The advancement of electric vehicles has created an increased need for charging equipment that delivers electric power to rechargeable batteries of the vehicles. Some such applications, such as high current, fast-charging vehicle chargers, are designed to work with continuous currents of 350 amps or more. To transfer energy more quickly and decrease charging times, the cable assembly (including cable and charging connector) should be capable of withstanding high current loads. Generally, the higher the current flow that passes through the charging equipment, the more heat is generated.

To mitigate the problem of excessive heat generation, the cross section of the current carrying conductor may be increased to reduce loss. However, such an increase in cross section requires an increased cable cross section, which makes the cable difficult to handle. Alternatively, the cable assembly may include a cooling conduit disposed near the conductors. The cooling conduit may carry a coolant fluid that can take away some or all of the heat generated in the conductors. However, the presence of the coolant fluid in the cable assembly poses new problems. For example, the coolant fluid may leak from the cooling conduit and may come in contact with electrical conductors, or a shield of the cable assembly. This may result in damage to the cable as well as to the charging equipment and the vehicle.

SUMMARY

The present disclosure relates to a cable assembly. In one embodiment, the cable assembly includes a cable having a first end and a second end. The cable has electric conductors and cooling conduits, each of which extends from the first end to the second end of the cable. The cooling conduit is adapted to convey a fluid that cools the electric conductor. In this embodiment, the cable assembly includes a leak detection module to detect a fluid leak from the cooling conduit. The leak detection module may include a power source to generate an input voltage signal which is applied at a first node that contacts with the fluid. The leak detection module includes a controller to monitor an output voltage signal at the nodes and to detect a leak of the fluid from the cooling conduit based on changes detected from the output voltage signal.

In some embodiments of the present invention, a cable assembly having a fluid-cooled cable is provided. The cable has a first end and a second end. The cable includes one or more electric conductors and a cooling conduit, each of which extends from the first end to the second end. The cooling conduit is adapted to convey a fluid that cools the electric conductor. The cable assembly includes a connector attached to the second end of the cable. The cooling conduit forms a fluid channel around inside a handle of the connector and is adapted to cool the connector. The cable assembly includes a leak detection module coupled to the cable and the connector. The leak detection module includes a power source to generate an input voltage signal wherein the input voltage signal is applied at a first node that contacts with the fluid. The leak detection module includes a controller to monitor an output voltage signal at the first node and to detect a leak of the fluid from the cooling conduit based on detected changes to the output voltage signal.

Figure 1:
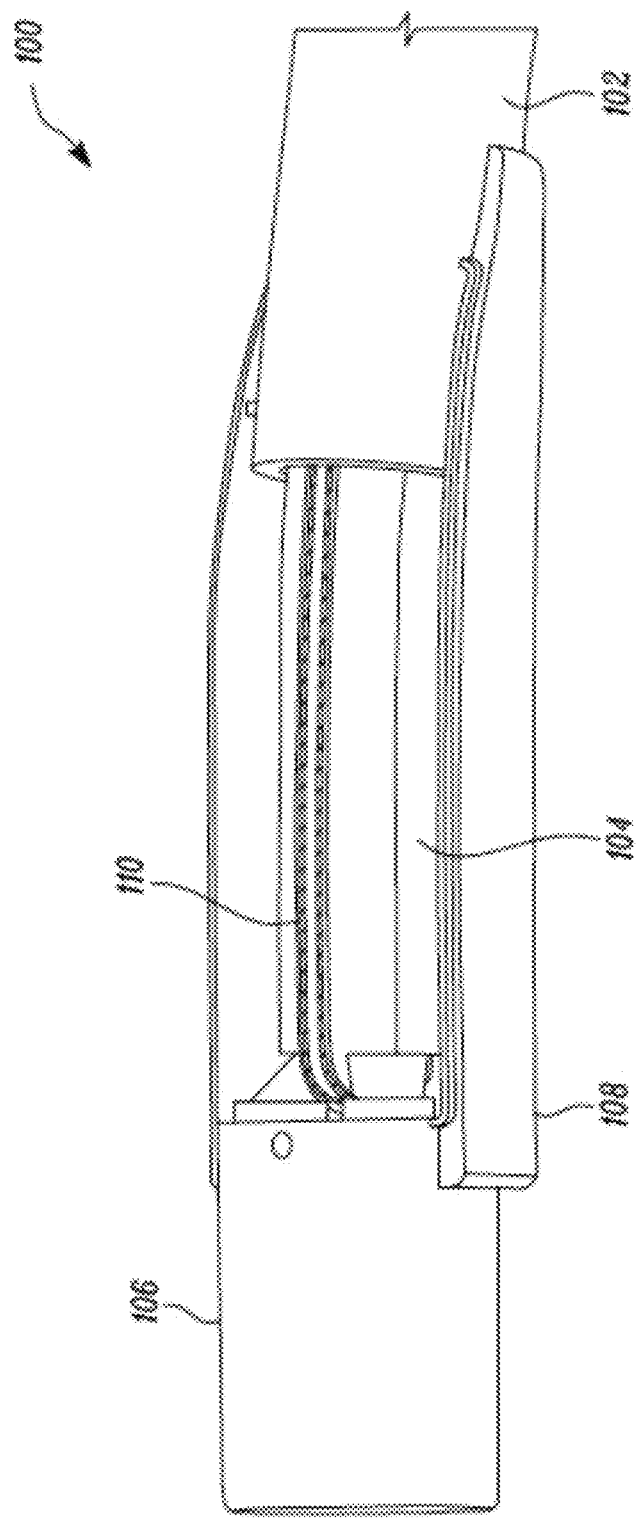
FIG. 1 illustrates exemplary connector and cable as part of a cable assembly, according to certain embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting it.

DETAILED DESCRIPTION

The following detailed description of embodiments presents various descriptions of specific embodiments of the invention. However, the invention can be embodied in a multitude of different ways. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Generally described, one or more aspects of the present disclosure relate to cable assemblies including leak detection modules. Illustratively, a leak detection module may allow detection of a leak of a coolant fluid in a cable assembly used for charging electric vehicles. Upon detecting the leak, the leak detection module may alert a user such that the user stops using the cable to charge the vehicle. In some configurations the leak detection module may automatically stop the power supply connected to the cable assembly from providing power to the cable. Thus, leak detection may help in avoiding faults in cable assemblies that may arise due to contact between coolant fluid and the electrical conductors and increase the safety of using such cable assemblies. Although various aspects of the cable assembly are described in an environment of charging of electric or hybrid vehicles, the cable assembly may also be used in any other application area which may allow use of such a fluid-cooled cable.

FIG. 1 illustrates an example of a charger assembly 100 having a cable 102 that runs laterally through the assembly 100. The cable 102 may have at least one electrical conductor 104 that is configured for transferring electric power. In some embodiments, the cable 102 may terminate in a connector tip 106 that is connected to a connector housing 108 (part of which is here removed for visibility). The connector tip 106 may be designed to be compatible with a power inlet and may therefore be configured according to one or more standards for electric connectors. The cable 102 may form the connection between the connector tip 106 and a power supply (e.g., a generator or an electric grid). The cable 102 may have a first end and a second end such that the first end of the cable 102 is coupled to the power supply and the second end is coupled to the connector tip 106. In some embodiments, the connector tip 106 and the connector housing 108 may be manufactured as a single piece. In other embodiments, the connector tip 106 and connector housing 108 may be manufactured as separate pieces.

A handle (not shown) may partially, or fully, enclose the connector tip 106 and/or the connector housing 108. The handle may also partially enclose the cable 102. The handle may be designed to be held by a person, such as when inserting the connector tip 106 into the power inlet, and when removing the connector tip 106 from the power inlet.

In certain embodiments, the charger assembly 100 may be used for charging an electric vehicle or a hybrid-electric vehicle. The electric vehicle may include an electric powertrain (not shown) for propelling the vehicle over a ground surface. The electric vehicle may include an energy storage device (not shown) for supplying energy to electric powertrain for propelling the electric vehicle. The energy storage device may be a collection of one or more battery cells. In some embodiments, the energy storage device may be any other energy storage means which may be suitable for application with various aspects of the present disclosure. The electric vehicle may include a charging inlet configured to receive the connector tip 106 in an inlet or receptacle for charging the energy storage device. The charging inlet may be internally connected to an energy storage device such that electrical energy may be supplied through the charging inlet to the energy storage device. In some embodiments, the charging inlet may interlock with the connector tip 106 such that the cable 102 may be secured without support from a person.

The cable 102 may include a cooling conduit 110. The cooling conduit 110 may serve to convey a fluid (e.g., a coolant) along the length of the conductor 104 so as to remove some or all of the heat generated by the flow of electrical energy within the conductor 104. Examples of such fluids or other heat transfer mediums may include, but are not limited to, water, air, oil, phase-changing materials, and other chemicals. For example, a non-degrading fluid can be chosen that has sufficient heat capacity to cool the conductor 104. The material for the cooling conduit 110 may be chosen based on its thermal conductivity, flexibility, and durability.

In some embodiments, the cooling conduit 110 may begin at the first end of the cable 102 at or near the power supply, and double back at or near the connector tip 106 to return to the first end of the cable 102. In such embodiments, the cooling conduit 110 may be a single tube such that the fluid travels along the same path in both directions. The fluid may be pumped from the first end of the cable 102 toward the connector tip 106, stored in an internal receptable at or near the connector tip 106 until all the fluid is in the receptable, then pumped back from the connector tip 106 toward the first end of the cable 102. In other embodiments, the cooling conduit 110 may have a U-turn at or near the connector tip 106 to reverse the flow direction of the fluid. With this and similar implementations, the cooling conduit 110 can provide continuous, circulating cooling along essentially the entire length of the cable 102 and within the connector tip 106. As such, the fluid can be returned to a system that provides the fluid, such as a reservoir of a cooling system. The path of the fluid may thus be circular, flowing on one side of the cable 102 toward the connector tip 106 and flowing on a different side of the cable 102 toward the reservoir. In certain embodiments, the U-turn can occur outside of the connector tip 106. For example, in an implementation where the fluid is fed into an electric vehicle during charging so as to provide cooling during the charging operation, the fluid can come out of the vehicle through the same connector tip 106 via the U-turn. In other implementations, a one-way flow of the fluid can be provided. For example, the connector tip 106 that attaches to the charging inlet of the electric vehicle (or other equipment) can also have a fluid inlet that is coupled to a fluid reservoir of the vehicle. As such, this arrangement may be used to replenish fluid in the fluid reservoir of the vehicle. In other embodiments, the fluid may flow from the cable 102 into the vehicle, and then return back from the vehicle to the beginning of the cable.

Figure 2:
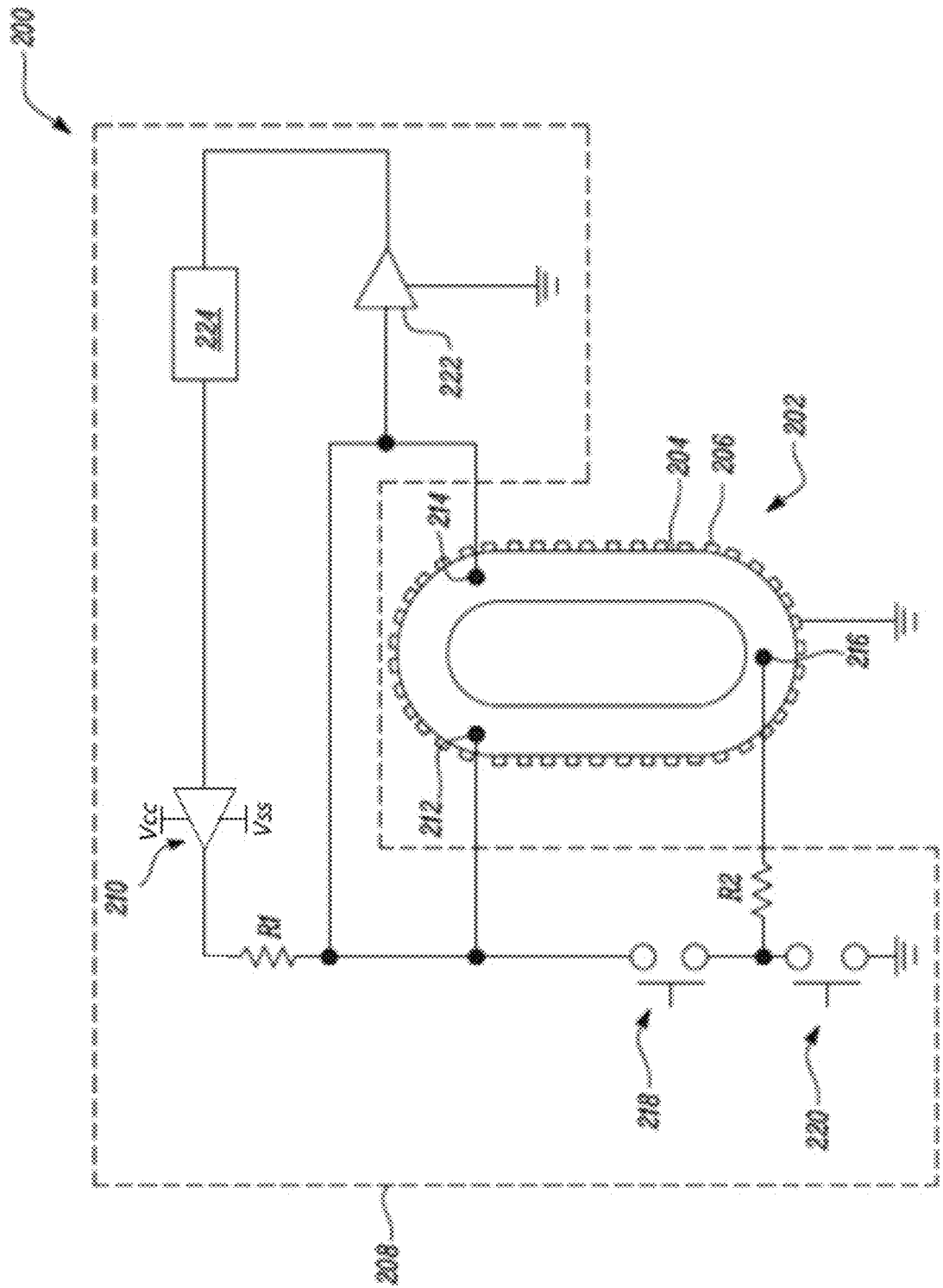
FIG. 2 schematically illustrates an example of a leak detection module for the cable assembly, according to certain embodiments of the present disclosure.

FIG. 2 schematically illustrates a leak detection system of a cable assembly 200, according to certain embodiments of the present disclosure. The cable assembly 200 may include a cable 202 having a cooling conduit 204 (shown in cross section). The cable 202 may be covered by a shield 206 which is connected to ground. The cable assembly 200 may include an electronic leak detection module 208 that is programmed and configured to detect a leak of the fluid from the cooling conduit 204. The leak detection module 208 may monitor changes in one or more electrical properties of the fluid circulating in the cooling conduit 204 to detect the leak. For example, changes in fluid electrical properties may occur if the leaked fluid comes into contact with a low voltage source (e.g., ground conductor or the shield 206) or a high voltage source (e.g., high voltage conductor).

With continued reference to FIG. 2, the leak detection module 208 may include a power source 210 that generates an input voltage signal to be applied to the fluid. In some embodiments, the power source 210 may generate an alternating current (AC) voltage signal that alternates between a maximum voltage (Vcc) and a minimum voltage (Vss). In other embodiments, the power source 210 may generate a direct current (DC) voltage signal of a predefined voltage. The input voltage signal may be applied to the fluid through a resistance R1 as shown in FIG. 2. In some embodiments, resistance R1 may be an impedance from a resistor. In other embodiments, resistance R1 may be an impedance from other electrical components. For monitoring the electrical properties of the fluid, one or more monitor nodes 212, 214 may be defined at predetermined locations within the cooling conduit 204. The one or more monitor nodes 212, 214 may be in contact with the fluid and polarize the fluid when the input voltage signal is applied to the nodes 212, 214. Use of two nodes, as opposed to only a single monitoring node, may improve redundancy and provide greater contact to polarize the fluid. However, it should be realized that only one node may be used within the scope of the present invention, and that two nodes are not required to monitor the electrical properties of the fluid. Locations of the monitor nodes 212, 214 may be selected so as to create an optimal geometry for monitoring the electrical properties of the fluid while minimizing the distance between the nodes 212, 214. In some embodiments, only one of the monitor nodes 212, 214 may be used to polarize the fluid and monitor the electrical properties of the fluid.

A test node 216 (shown in FIG. 2) may be provided in some embodiments to simulate a leak of the fluid via a resistance R2. In some embodiments, resistance R2 may be an impedance from a resistor. In other embodiments, resistance R2 may be an impedance from other electrical components. The resistance R2 may be connected to one or more switches 218, 220 that allow the resistance R2 to alternate connection between the leak detection module 208 and ground. As detailed herein, changing the resistance R2 connections may cause the leak detection module 208 to alternate between a self-check mode and a normal operation mode.

Referring to FIG. 2, the leak detection module 208 may include a buffer 222 connected with the monitor nodes 212, 214 and ground. The buffer 222 may monitor the output voltage signal at the nodes 212, 214. The impedance of the fluid may act as a voltage divider between the power source 210 and ground.

The leak detection module 208 may include a controller 224 to detect a leak of the fluid from the cooling conduit 204. The controller 224 may receive the input voltage signal from the power source 210. Further, the controller 224 may receive the output voltage signal from the buffer 222. In some embodiments, the buffer 222 may be implemented within the controller 224. The controller 224 may determine a voltage associated with the output voltage signal, such as a peak-to-peak output voltage or a maximum output voltage. To detect the leak, the controller 224 may monitor decay of the output voltage, the peak-to-peak output voltage, or the maximum output voltage of the output voltage signal. In some embodiments, the controller 224 may repeatedly compute changes in the amplitude of the output voltage signal by computing a difference between the amplitudes measured after a fixed time interval (e.g., 5 seconds). The controller 224 may identify a leak when the measured amplitude (e.g., peak-to-peak output voltage or the maximum output voltage) drops by more than a predetermined threshold voltage drop. In one embodiment, the threshold value may be chosen sufficiently high such that small variations in the peak-to-peak voltage or the maximum voltage are not detected as a leak of the fluid.

The controller 224 may generate an indication of the leak for a user or an operator of the cable assembly 200. The indication may be a visual indication, an audio indication, or a tactile indication. Upon receiving the indication, the user may stop the transfer of electrical power through the cable assembly 200 to avoid any faults and minimize the associated risks. In some embodiments, the controller 224 may automatically take an action (e.g., stop the charging of the electric vehicle) upon detecting the leak.

In some embodiments, the leak detection module 208 may operate in one of a self-check mode and a normal operation mode. As shown in FIG. 2, switches 218, 220 may be provided to switch between the self-check mode and the normal operation mode by changing the connections of the resistance R2. In the self-check mode of operation, the controller 224 may open the switch 218 connecting the resistance R2 to the leak detection module 208 and close the switch 220 connecting the resistance R2 to ground. Thus, the test node 216 may be connected to ground via the resistance R2 to simulate a leak that causes the fluid to come into contact with the shield 206. Specifically, the resistance R2 may be in series with the impedance of the fluid, resulting in increased impedance perceived by the buffer 222. Due to the increased impedance, the amplitude of the output voltage signal may decrease as compared to the amplitude in the normal operation mode. In another embodiment, the system may perform a self-check by closing both switches 218, 220. In this embodiment, the input of the buffer may be connected to ground and may allow the system to validate that the switches 218, 220 are functioning properly.

In the normal operation mode, the controller 224 may close the switch 218 connecting the resistance R2 to the leak detection module 208 and open the switch 220 connecting the resistance R2 to ground. In the normal operation mode, and when there is no leak of the fluid, the resistance R2 may be connected in parallel with the impedance of the fluid and no substantial change in the impedance may be perceived by the buffer 222. Thus, the peak-to-peak voltage or the maximum voltage associated with the output voltage signal may maintain a substantially constant level. The test node 216 may be removed from the cable assembly 200 by opening both switches 218, 220.

Figure 3:
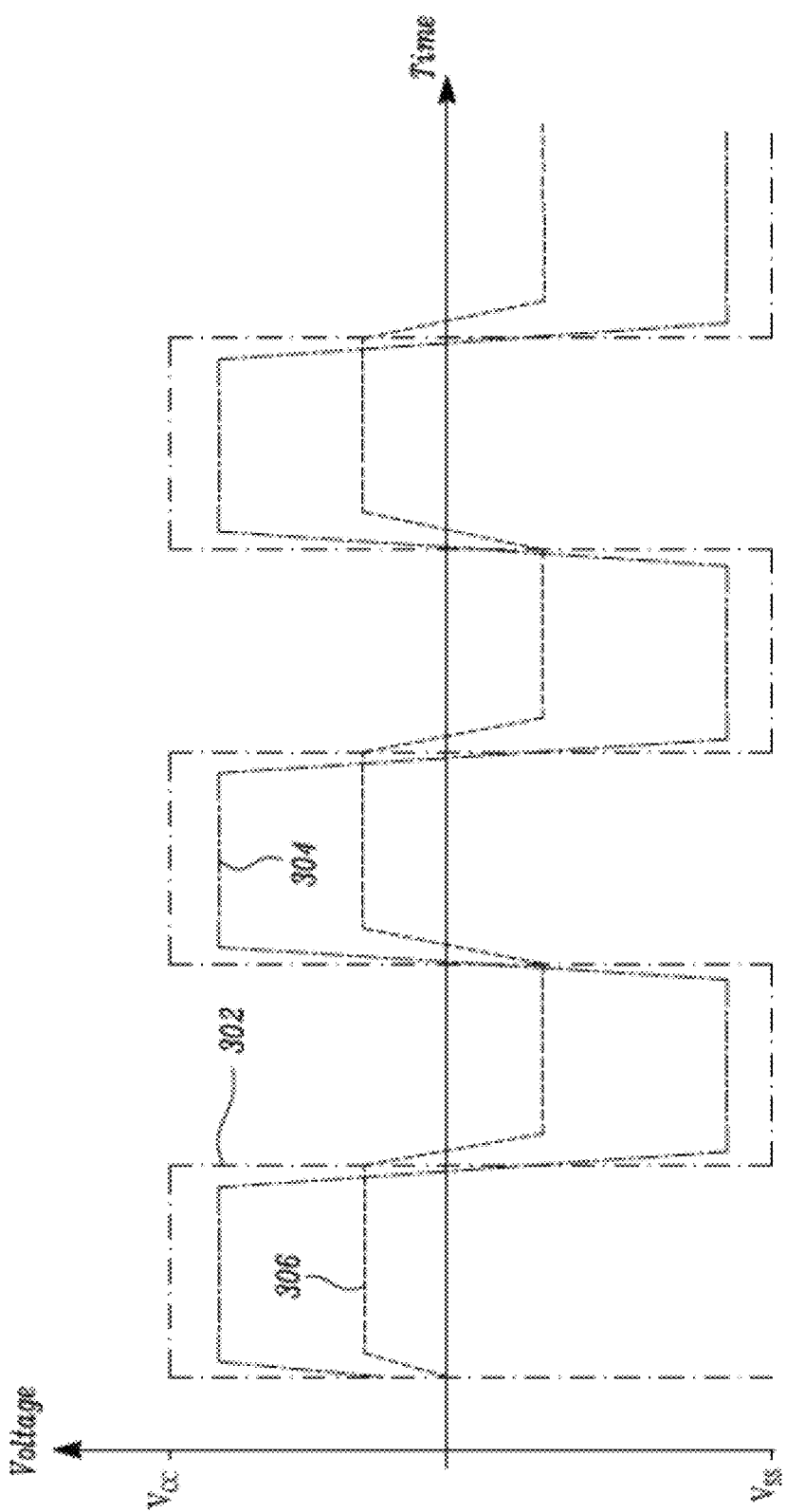
FIG. 3 illustrates exemplary voltage waveforms at various nodes of the leak detection module, according to certain embodiments of the present disclosure.

FIG. 3 illustrates the voltage signal waveforms in an example embodiment of the present disclosure. Waveform 302 depicts the input voltage signal generated by the power source 210. The waveform 302 may alternate between a maximum voltage (Vcc) and a minimum voltage (Vss). Waveform 304 shows the output voltage signal at the monitor nodes 212, 214 in the normal operation mode of the leak detection module 208 when there is no leak of the fluid. Waveform 306 shows the output voltage signal at the monitor nodes 212, 214 in the case of a leak. As described herein, the amplitude of the output voltage in a leak scenario may be smaller than the amplitude of the output voltage in a non-leak scenario. The leak detection module 208 may identify a leak when the measured amplitude drops by more than a predetermined threshold voltage drop. The threshold value may be chosen sufficiently high such that small variations in the peak-to-peak voltage are not detected as a leak of the fluid.

Figure 4:
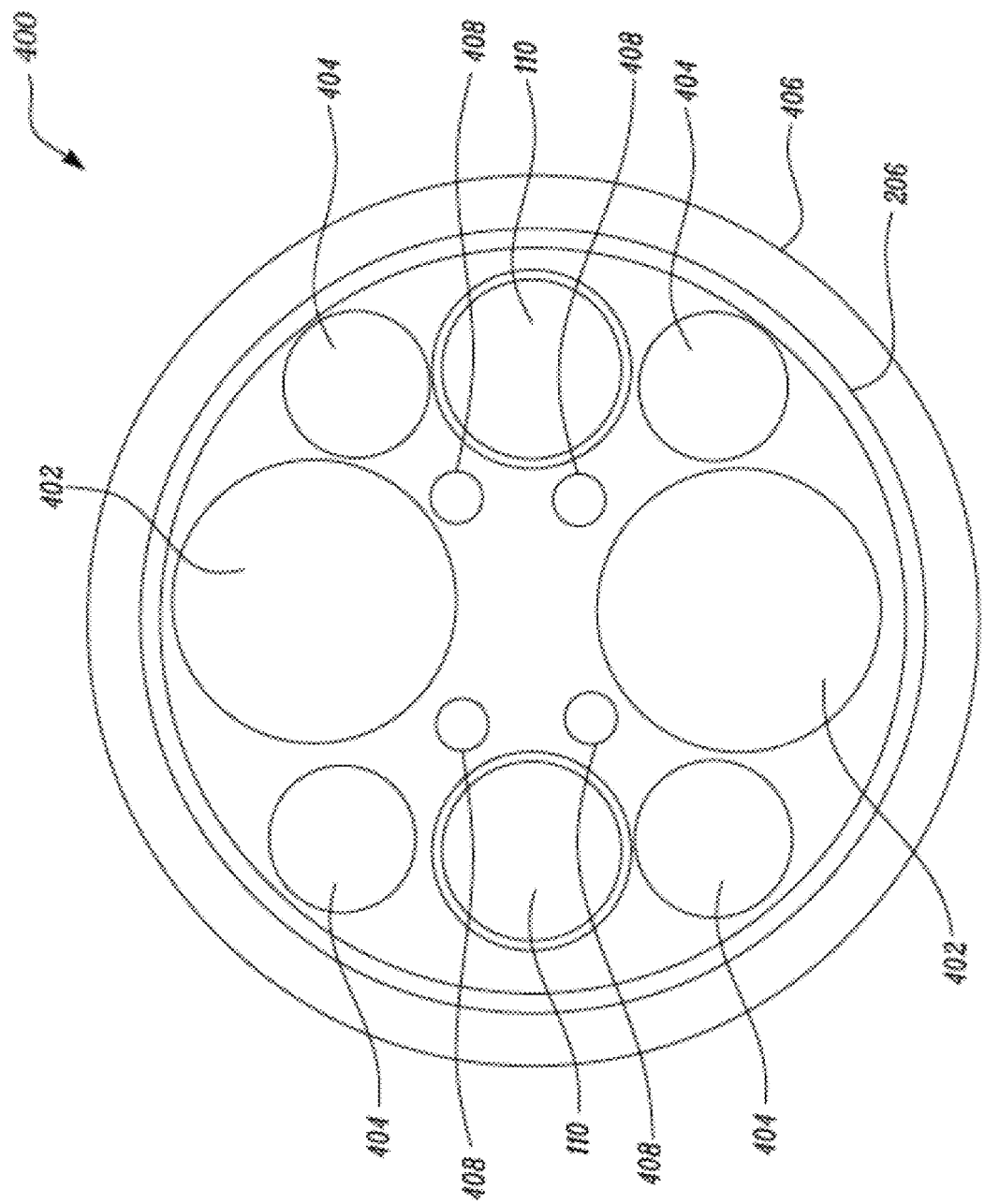
FIG. 4 illustrates an exemplary cross section of the cable assembly, according to certain embodiments of the present disclosure.

FIG. 4 illustrates an example cross-sectional view of a cable assembly 400 showing multiple sets of conductors 402, 404 and the cooling conduit 110 according to certain embodiments of the present disclosure. The cable assembly 400 may include high voltage conductors 402, low voltage conductors 404, and the cooling conduit 110, inside a shield 206.

The high voltage conductors 402 and the low voltage conductors 404 can have one or more insulating materials surrounding the outside of each to provide electric insulation. The cooling conduit 110 may have one or more channels inside to allow the fluid to flow in at least one direction. Generally, the cooling provided by the cooling conduit 110 may allow the cable 102 to be made with a smaller diameter of the outer jacket 406 than otherwise. Further, the cable assembly 400 may contain ground conductors 408 and one or more additional members, such as signal cables and/or filler material. The cable components are shown with a certain separation from each other for clarity, with the understanding that the components could completely fill the interior of the outer jacket 406 in some implementations.

As shown in FIG. 4, the cooling conduit 110 may be placed close to the conductors 402, 404. Accordingly, the cooling conduit 110 may provide cooling to each of the conductors 402, 404.

Figure 5:
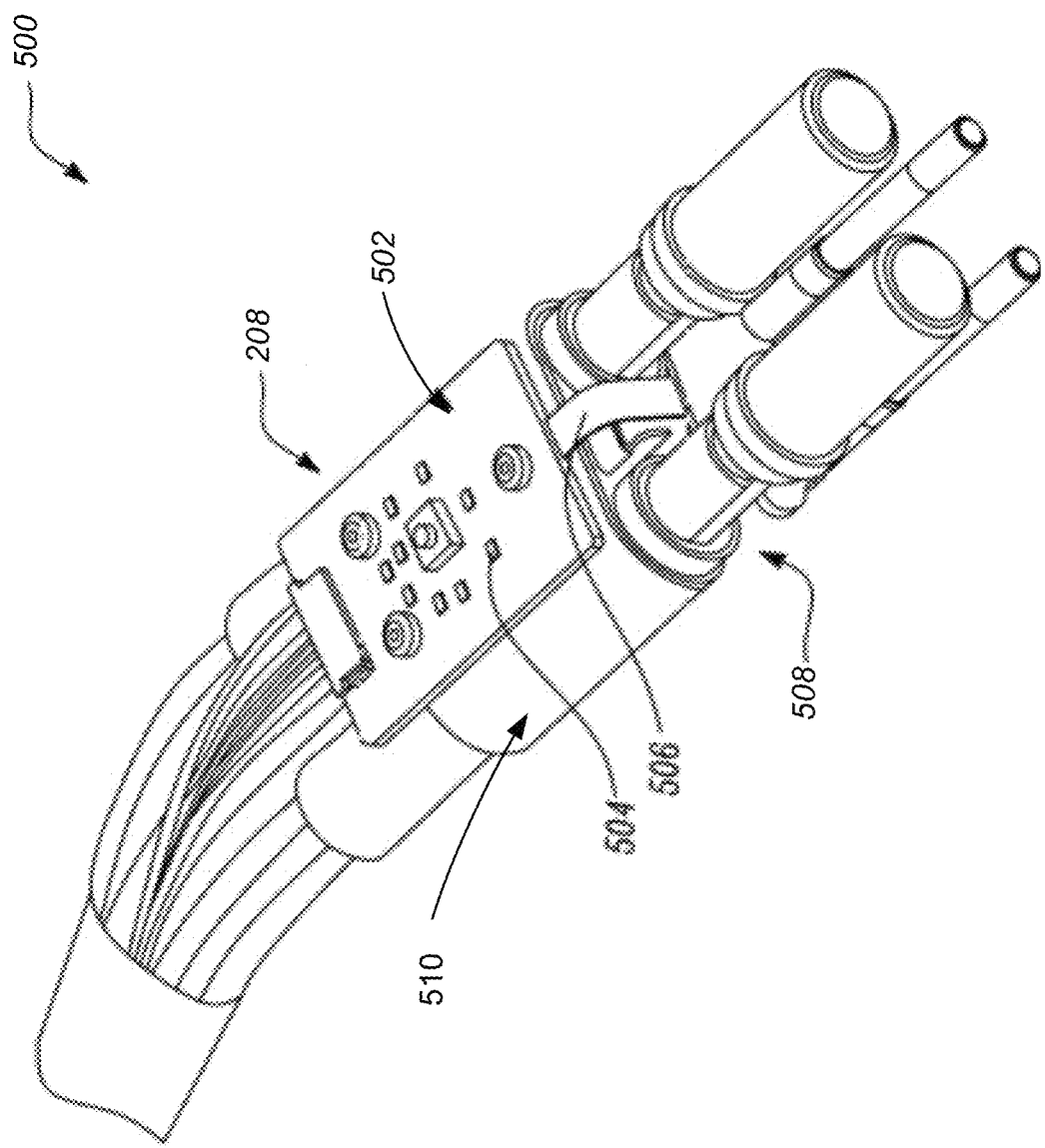
FIG. 5 illustrates a perspective view of the connector, according to certain embodiments of the present disclosure.

FIG. 5 shows an example of the leak detection module 208 resident within the connector 500. The leak detection module 208 may include a Printed Circuit Board Assembly (PCBA) 502 that is thermally coupled to the high voltage socket 508. In certain embodiments, the PCBA 502 is a two-part structure. A first part 504 of the PCBA may be coupled to the high voltage socket 508 such that the first part 504 of the PCBA sits on top of electrical sockets of the high voltage socket 508. A second part 506 of the PCBA may be connected to the first part 504 of the PCBA through a rigid-flex PCB construction, or other similar interconnects. The second part 506 of the PCBA may house auxiliary components, such as, but not limited to, thermistors for temperature sensing applications. The two-part structure of the PCBA 502 allows for more efficient routing of electrical wires to each high voltage socket 508. The PCBA 502 may include the various components of the leak detection module 208, such as the power source 210, the buffer 222, and the controller 224. In certain embodiments, the PCBA 502 may include one or more temperature sensors (not shown) for collecting temperature data associated with the cable assembly 200. In some embodiments, wings 510 may be present around the manifold. The wings 510 may be made of a conductive material and serve as increased ground connection area to detect leaks. The wings 510 may be part of the PCBA 502 but need not be. The location of the wings 510 may be selected based at least in part on where coolant is most likely to leak from or pool in a faulty charger assembly.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed cable assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. A cable assembly comprising:
   a cable having a first end and a second end, the cable comprising an electric conductor and a cooling conduit, each of which extends from the first end to the second end, wherein the cooling conduit is adapted to convey a fluid that cools the electric conductor; and
   a leak detection module coupled to the cable, the leak detection module comprising:
      a power source to generate an input voltage signal wherein the input voltage signal is applied to the fluid at a first node in contact with the fluid; and
      a controller configured to monitor an output voltage signal and to detect a leak of the fluid from the cooling conduit based on the output voltage signal.

2. The cable assembly of claim 1, wherein the fluid is electrically conductive.

3. The cable assembly of claim 1, wherein the cooling conduit is configured to convey the fluid from the first end to the second end, and thereafter from the second end to the first end.

4. The cable assembly of claim 1, wherein the input voltage signal is an alternating current (AC) voltage signal.

5. The cable assembly of claim 1, wherein the input voltage signal is further applied at a second node in contact with the fluid.

6. The cable assembly of claim 1, wherein the controller detects the leak of the fluid when a peak-to-peak voltage of the output voltage signal drops more than a predetermined threshold voltage drop value.

7. The cable assembly of claim 1, wherein the controller detects the leak of the fluid when a maximum voltage of the output voltage signal drops more than a predetermined threshold maximum voltage value.

8. The cable assembly of claim 1, wherein the controller further provides, upon detecting the leak of the fluid, at least one of: a visual indication, an audio indication, or a tactile indication.

9. The cable assembly of claim 1 further comprising a connector attached to the second end of the cable, wherein the cooling conduit forms a fluid channel around an interior of a handle of the connector.

10. The cable assembly of claim 1, wherein the cable assembly is used for charging an electric vehicle from a power supply.

11. The cable assembly of claim 10, wherein the controller, upon detecting the leak of the fluid, automatically stops charging of the electric vehicle.

12. A cable assembly comprising:
- a cable having a first end and a second end, the cable comprising an electric conductor and a cooling conduit, each of which extends from the first end to the second end, wherein the cooling conduit is adapted to convey a fluid that cools the electric conductor; and
- a connector attached to the second end of the cable, wherein the cooling conduit forms a fluid channel around an interior of a handle of the connector and is adapted to cool the connector; and
- a leak detection module coupled to the cable and the connector, the leak detection module comprising:
  - a power source to generate an input voltage signal wherein the input voltage signal is applied to the fluid at a first node in contact with the fluid; and
  - a controller configured to monitor an output voltage signal and to detect a leak of the fluid from the cooling conduit based on the output voltage signal.

13. The cable assembly of claim 12, wherein the cable assembly is used for charging an electric vehicle from a power supply.

14. The cable assembly of claim 13, wherein the controller, upon detecting the leak of the fluid, automatically stops charging of the electric vehicle.

15. The cable assembly of claim 12, further comprising switches connected to a second node, wherein the second node is in contact with the fluid and wherein the switches are configurable to simulate the leak of the fluid.

16. The cable assembly of claim 12, wherein the fluid is electrically conductive.

17. The cable assembly of claim 12, wherein the cooling conduit is configured to convey the fluid from the first end to the second end, and thereafter from the second end to the first end.

18. The cable assembly of claim 12, wherein the controller further provides, upon detecting the leak of the fluid, at least one of: a visual indication, an audio indication, or a tactile indication.

19. The cable assembly of claim 12, wherein the controller detects the leak of the fluid when a peak-to-peak voltage of the output voltage signal drops more than a predetermined threshold voltage drop value.

20. The cable assembly of claim 12, wherein the controller detects the leak of the fluid when a maximum voltage of the output voltage signal drops more than a predetermined threshold maximum voltage value.

21. A cable assembly comprising:
- a cable having a first end and a second end, the cable comprising an electric conductor and a cooling conduit, each of which extends from the first end to the second end, wherein the cooling conduit is adapted to convey a fluid that cools the electric conductor; and
- a leak detection module coupled to the cable, the leak detection module comprising:
  - a power source to generate an input voltage signal wherein the input voltage signal is applied to the fluid at a first node in contact with the fluid; and
  - a controller configured to monitor an output voltage signal and to characterize a leak of the fluid from the cooling conduit based on the output voltage signal based on a comparison of the monitored output voltage signal with two representative output voltage values, a first representative output voltage value associated with a fluid leak and a second representative output voltage value not associated with a fluid leak.

22. The cable assembly of claim 21, wherein the fluid is electrically conductive.

23. The cable assembly of claim 21, wherein the cable assembly is used for charging an electric vehicle from a power supply.

* * * * *